United States Patent
Saretto et al.

(10) Patent No.: US 11,059,018 B2
(45) Date of Patent: Jul. 13, 2021

(54) TURBOMACHINE CHEMICAL REACTOR AND METHOD FOR CRACKING HYDROCARBONS IN A PROCESS FLUID

(71) Applicant: Dresser-Rand Company, Houston, TX (US)

(72) Inventors: Silvano R. Saretto, Snoqualmie, WA (US); Paul Morrison Brown, Seattle, WA (US); Kirk Ryan Lupkes, Issaquah, WA (US); David Andrew Taylor, Issaquah, WA (US)

(73) Assignee: DRESSER-RAND COMPANY, Houston, TX (US)

( * ) Notice: Subject to any disclaimer, the term of this patent is extended or adjusted under 35 U.S.C. 154(b) by 0 days.

(21) Appl. No.: 17/049,671

(22) PCT Filed: May 16, 2018

(86) PCT No.: PCT/US2018/032955
§ 371 (c)(1),
(2) Date: Oct. 22, 2020

(87) PCT Pub. No.: WO2019/221726
PCT Pub. Date: Nov. 21, 2019

(65) Prior Publication Data
US 2021/0069665 A1   Mar. 11, 2021

(51) Int. Cl.
*B01J 3/08* (2006.01)
*B01J 19/10* (2006.01)
(Continued)

(52) U.S. Cl.
CPC ........... *B01J 19/0066* (2013.01); *B01J 3/08* (2013.01); *B01J 6/008* (2013.01); *B01J 19/008* (2013.01);
(Continued)

(58) Field of Classification Search
None
See application file for complete search history.

(56) References Cited

U.S. PATENT DOCUMENTS

| 4,265,732 A | * 5/1981 | Dinulescu ............. B01J 3/08 |
| | | 208/106 |
| 4,441,855 A | 4/1984 | Tayler |
| (Continued) | | |

FOREIGN PATENT DOCUMENTS

| CA | 2218592 A1 | 10/1996 |
| CN | 1181719 A | 5/1998 |

(Continued)

OTHER PUBLICATIONS

PCT International Search Report and Written Opinion dated Jan. 21, 2019 corresponding to PCT Application No. PCT/US2018/032955 filed May 16, 2018.
(Continued)

*Primary Examiner* — Jennifer A Leung (57) ABSTRACT

Chemical reactors (10) and methods crack hydrocarbons in process fluids by accelerating the process fluid to a velocity greater than Mach 1 with an axial impulse impeller (40) and generating a shock wave (90) in the process fluid by decelerating it in a static diffuser (70) having diverging diffuser passages (72). Temperature increase of the process fluid downstream of the shockwave cracks the entrained hydrocarbons in a single pass, through a unidirectional flow path (F), within a single stage, without recirculating the process fluid for another pass through the same stage. In some embodiments, the turbomachine chemical reactor (110) has multiple successive stages of one or more axial impulse impellers (40A, 40B), paired with a diverging passage, static diffuser (70). Successive stages crack additional hydrocarbons by successively raising temperature of the flowing process fluid.

13 Claims, 7 Drawing Sheets

(51) Int. Cl.
   *B01J 19/18*   (2006.01)
   *C10G 9/00*    (2006.01)
   *F01D 1/02*    (2006.01)
   *B01J 19/00*   (2006.01)
   *B01J 6/00*    (2006.01)

(52) U.S. Cl.
   CPC .......... *B01J 19/10* (2013.01); *B01J 19/1806* (2013.01); *B01J 19/1862* (2013.01); *C10G 9/00* (2013.01); *F01D 1/02* (2013.01); *B01J 2219/0004* (2013.01)

(56) References Cited

U.S. PATENT DOCUMENTS

| | | | | |
|---|---|---|---|---|
| 4,968,216 | A * | 11/1990 | Anderson | F01D 5/141 |
| | | | | 415/199.5 |
| 5,346,365 | A * | 9/1994 | Matyscak | F01D 25/243 |
| | | | | 415/213.1 |
| 5,914,027 | A | 6/1999 | Ellingsen | |
| 6,016,798 | A | 1/2000 | Selivanov | |
| 6,019,499 | A | 2/2000 | Selivanov | |
| 6,094,354 | A | 7/2000 | Nakajoh et al. | |
| 6,533,545 | B1 * | 3/2003 | Hirano | F01D 5/141 |
| | | | | 415/191 |
| 7,232,937 | B2 * | 6/2007 | Bushuev | B01J 19/0066 |
| | | | | 585/648 |
| 7,767,159 | B2 | 8/2010 | Glotov | |
| 9,234,140 | B2 | 1/2016 | Seppala et al. | |
| 2005/0137440 | A1 | 6/2005 | Bushuev | |
| 2012/0020841 | A1 * | 1/2012 | Bushuev | F01D 1/16 |
| | | | | 422/129 |
| 2014/0243569 | A1 * | 8/2014 | Seppala | C10G 9/00 |
| | | | | 585/638 |
| 2017/0145458 | A1 | 5/2017 | Gordon et al. | |

FOREIGN PATENT DOCUMENTS

| | | | | |
|---|---|---|---|---|
| CN | 1181803 | A | 5/1998 | |
| DE | 102010063021 | A1 | 6/2012 | |
| EP | 0349051 | A1 | 1/1990 | |
| EP | 1260266 | A1 | 11/2002 | |
| GB | 191021699 | A * | 5/1911 | F01D 1/04 |
| GB | 2475140 | A | 5/2011 | |
| WO | WO-9410261 | A1 * | 5/1994 | B01J 19/10 |
| WO | 03092884 | A1 | 11/2003 | |
| WO | 03093398 | A1 | 11/2003 | |
| WO | 2006067636 | A2 | 6/2006 | |
| WO | 2016001476 | A1 | 1/2016 | |

OTHER PUBLICATIONS

PCT International Preliminary Report on Patentability dated Aug. 31, 2020 corresponding to PCT Application No. PCT/US2018/032955 filed May 16, 2018.

* cited by examiner

TURBOMACHINE CHEMICAL REACTOR AND METHOD FOR CRACKING HYDROCARBONS IN A PROCESS FLUID

TECHNICAL FIELD

The invention relates to chemical reactors and methods for cracking hydrocarbons in a process fluid. More particularly, the invention relates to turbomachine chemical reactors and methods for cracking hydrocarbons.

BACKGROUND

Oil refineries and petrochemical plants fraction or "crack" heavier molecular weight (MW) hydrocarbons. After cracking, the lighter molecular weight hydrocarbons are used in the petrochemical industry as feedstock for production of other chemical compounds. In known, commercially practiced, pyrolysis-cracking processes, application of heat and pressure in furnace-type, chemical reactors, in low oxygen environments, fractionalizes heavier MW hydrocarbons into various lighter MW olefins, such as ethylene, without causing combustion. Often, the heavier MW hydrocarbon is entrained in heated steam. The steam- and hydrocarbon-containing process fluid flows through heat exchangers of the chemical reactor. Imparted temperature and residence time of the process fluid within heat exchangers are controlled to fracture the entrained hydrocarbons to the desired output, lower MW hydrocarbons.

Using the example of ethylene production by pyrolysis, a process fluid comprising hydrocarbon and steam mixture is heated from 1220° F. to 1545° F. in less than 400 milliseconds (MS), in a furnace-type chemical reactor. The rate at which the heating is done and subsequently quenched (to halt further chemical reactions) is important for the production of the desired blend of hydrocarbons. Oxygen must not be present during the heating process, in order to avoid hydrocarbon combustion. The reaction process in the furnace-type chemical reactor requires large heat input and relatively slow mass flow rate of the process fluid. In order to meet output production goals, ethylene production plants employ multiple, parallel pyrolysis reactors, each requiring large thermal energy inputs. Each additional reactor needed to meet production goals increases capital spending, energy consumption to heat the process fluid, plant real estate space.

It is desirable to increase mass flow of process fluid during the hydrocarbon cracking process, with lower production energy input. Increased mass flow meets production goals with less plant equipment capital spending and real estate space.

SUMMARY OF INVENTION

Exemplary embodiments of chemical reactors and methods described herein crack hydrocarbons in process fluids by accelerating the process fluid in a to a velocity greater than Mach 1 with an axial impulse impeller and generating a shock wave in the process fluid by decelerating it in a static diffuser having diverging diffuser passages. Cracking occurs in a single stage, at faster reaction rates and less energy input than traditional pyrolysis-type chemical reactors. Increased mass flow rate afforded by the present invention embodiments, compared to traditional pyrolysis-type chemical reactors and processes, increases production output with less plant equipment capital spending along with the lower energy usage.

The housing of the turbomachine chemical reactor, described herein, has an annular housing passage, which defines a unidirectional, axial flow path from a housing inlet to a housing exit. A rotating, axial impulse impeller imparts energy to and discharges the process fluid at a velocity greater Mach 1. A static annular diffuser, having diverging diffuser passages, is in the annular housing passage, oriented between the axial impulse impeller and the exit of the housing. The diffuser passages are configured to decelerate process fluid therein, discharged from the impeller blades, to a speed less than Mach 1. The deceleration generates a shock wave in the process fluid, raising temperature thereof downstream of the shock wave sufficient to crack its entrained hydrocarbons, prior to discharge thereof from the exit of the housing or to a next, successive stage in the chemical reactor. In some embodiments, the turbomachine chemical reactor has multiple successive stages of one or more axial impulse impellers, paired with a diverging passage, static diffuser. Each chemical reactor stage cracks hydrocarbons in the process fluid in a single, unidirectional flow path from its inlet to its outlet, without recirculating the process fluid in the opposite direction for another pass through the same stage. The unidirectional flow path facilitates cracking in a relatively short, large cross-sectional, annular flow path. In some embodiments, hydrocarbons are cracked in a single stage in ten milliseconds (10 MS) or less, with high mass flow rates. In some embodiments, successive stages incorporating the impulse impeller(s) and a paired, diverging-type static diffuser crack additional hydrocarbons by successively raising process fluid temperature in each stage.

Exemplary embodiments of the invention feature a chemical reactor for cracking hydrocarbon in a process fluid. The chemical reactor includes a housing having a housing inlet; a housing exit; and an annular housing passage, which defines a unidirectional, axial flow path from the housing inlet to the housing exit, for receiving and cracking hydrocarbon in a process fluid therein. A rotary shaft, in the housing, is circumscribed by the annular housing passage, for coupling to a shaft-rotating power source, such as an electric motor or a turbine engine. The rotary shaft defines a shaft centerline axis that is in fixed orientation in the housing and congruent with its axis of rotation. An axial impulse impeller is mounted about the rotary shaft within the annular housing passage, and in fluid communication with process fluid flowing between the inlet and exit of the housing. The impeller has an impeller hub with an axial length extending axially along the shaft centerline axis of the rotary shaft. A row of a plurality of impeller blades projects outwardly from the impeller hub. Each of the respective impeller blades has a leading edge facing the housing inlet, a trailing edge facing the housing exit, a blade tip distal the impeller hub in opposed, spaced relationship with the annular housing passage, and opposed concave and convex blade sidewalls between the blade's tip its leading and trailing edges. The impeller blades are configured, upon rotation of the rotary shaft, to turn the velocity of the process fluid tangentially relative to the shaft centerline axis from a first tangential direction at the blade leading edge to an opposite tangential direction at the blade trailing edge, and impart energy therein to discharge the process fluid from their respective trailing edges, at a velocity greater Mach 1. A static annular diffuser is in the annular housing passage, oriented between the axial impulse impeller and the exit of the housing. The static annular diffuser has a row of a plurality of radially oriented, circumferentially spaced diffuser passages spanning the annular housing passage. Each of the respective diffuser passages has a first axial end facing the axial impulse impeller, and a second axial end facing the housing exit. Local cross section of each diffuser passage increases from its first axial end to its second axial end. The diffuser passages are configured to decelerate process fluid therein, discharged from the impeller blades, to a speed less than Mach 1. The deceleration generates a shock wave in the process fluid, raising temperature thereof downstream of the shock wave, prior to discharge thereof from the exit of the housing.

Other exemplary embodiments of the invention feature methods for cracking hydrocarbons in a process fluid. An exemplary method is practiced in a chemical reactor, which includes a housing having: a shaft centerline axis that is in fixed orientation in the housing; a housing inlet; a housing exit; and an annular housing passage defining a unidirectional, axial flow path for the process fluid from the housing inlet to the housing exit. An axial impulse impeller is within the annular housing passage, and is rotatively driven about an impeller axis of rotation that is congruent with the shaft centerline axis. A static annular diffuser is within the annular housing passage, having a first axial end facing the axial impulse impeller and a second axial end facing the exit of the housing. The static annular diffuser defines diffuser passages having locally increasing, cross-sectional area from the first to the second axial end. When practicing this method, a flow of hydrocarbon-containing process fluid is introduced into the housing inlet. The impeller is driven rotatively with a shaft-rotating power source, turning the velocity of the process fluid tangentially relative to the shaft centerline axis from a first tangential direction at leading-edge, axial end of the impeller to an opposite tangential direction at a trailing-edge, axial end of the impeller. Impeller rotation imparts energy into the process fluid, which accelerates the fluid to a velocity greater Mach 1. The process fluid is discharged from the impeller through the diffuser passages of the static annular diffuser, decelerating the process fluid flowing therethrough to a speed less than Mach 1, and generating a shock wave in the fluid within the diffuser passages. This raises temperature of the process fluid downstream of the shock wave, and cracks the hydrocarbons in the fluid.

The respective features of the exemplary embodiments of the invention that are described herein may be applied jointly or severally in any combination or sub-combination.

BRIEF DESCRIPTION OF DRAWINGS

The exemplary embodiments of the invention are further described in the following detailed description in conjunction with the accompanying drawings, in which.

To facilitate understanding, identical reference numerals have been used, where possible, to designate identical elements that are common to the figures. The figures are not drawn to scale.

DESCRIPTION OF EMBODIMENTS

Exemplary method and apparatus embodiments of the invention crack or fractionalize hydrocarbons in process fluids, such as hydrocarbons entrained in steam. Chemical reactors and methods described in detail herein crack hydrocarbons in a turbomachine chemical reactor, by accelerating the process fluid in a to a velocity greater than Mach 1 with an axial impulse impeller and generating a shock wave in the process fluid by decelerating it in a static diffuser having diverging diffuser passages. In some embodiments, static pressure of the process fluid remains relatively constant (e.g., within plus or minus ten percent) as it passes through the impulse impeller(s), but rises downstream of the shockwave. Temperature increase of the process fluid downstream of the shockwave cracks the entrained hydrocarbons in a single pass, through a unidirectional flow path, within a single stage, without recirculating the process fluid for another pass through the same stage. In some embodiments, the temperature increase through a single stage is greater than ten percent. Thus, in some embodiments, the process fluid passes through the single stage in 10 MS or less, compared to hundreds of milliseconds in known pyrolysis-type reactors. Faster mass flow rates in the chemical reactors of the present invention increase production output. Unlike known pyrolysis-type reactors, external heat is not applied to the process fluid in the chemical reactors of the present invention, in order to initiate or maintain the cracking chemical reaction. Elimination of external heating for operating the presently described, a turbomachine chemical reactor, as otherwise required in pyrolysis-type reactors, reduces energy expenditure.

In some embodiments, the turbomachine chemical reactor, or a sequential chain of such reactors, has multiple successive stages of one or more axial impulse impellers, paired with a diverging passage, static diffuser. Successive stages crack additional hydrocarbons by successively raising temperature of the flowing process fluid. In some embodiments, respective, multiple stages share a common housing, or are in separate, sequential housings, or they are in a combination of separate and common housings in a common feedstock line. In some embodiments, one or more stages in a first reactor function as a preheater of the process fluid, before its flow into a downstream reactor. In some embodiments, quenching zones are incorporated in chemical reactors downstream of an impeller. Some quenching zone embodiments introduce coolant fluid into the process fluid, in order to stabilize temperature of the process fluid. Other quenching zones introduce anti-fouling fluid into the process fluid, in order to inhibit fouling within the diffuser passages. Yet other quenching zones introduce both cooling and anti-fouling fluid into the process fluid.

Figure 1:
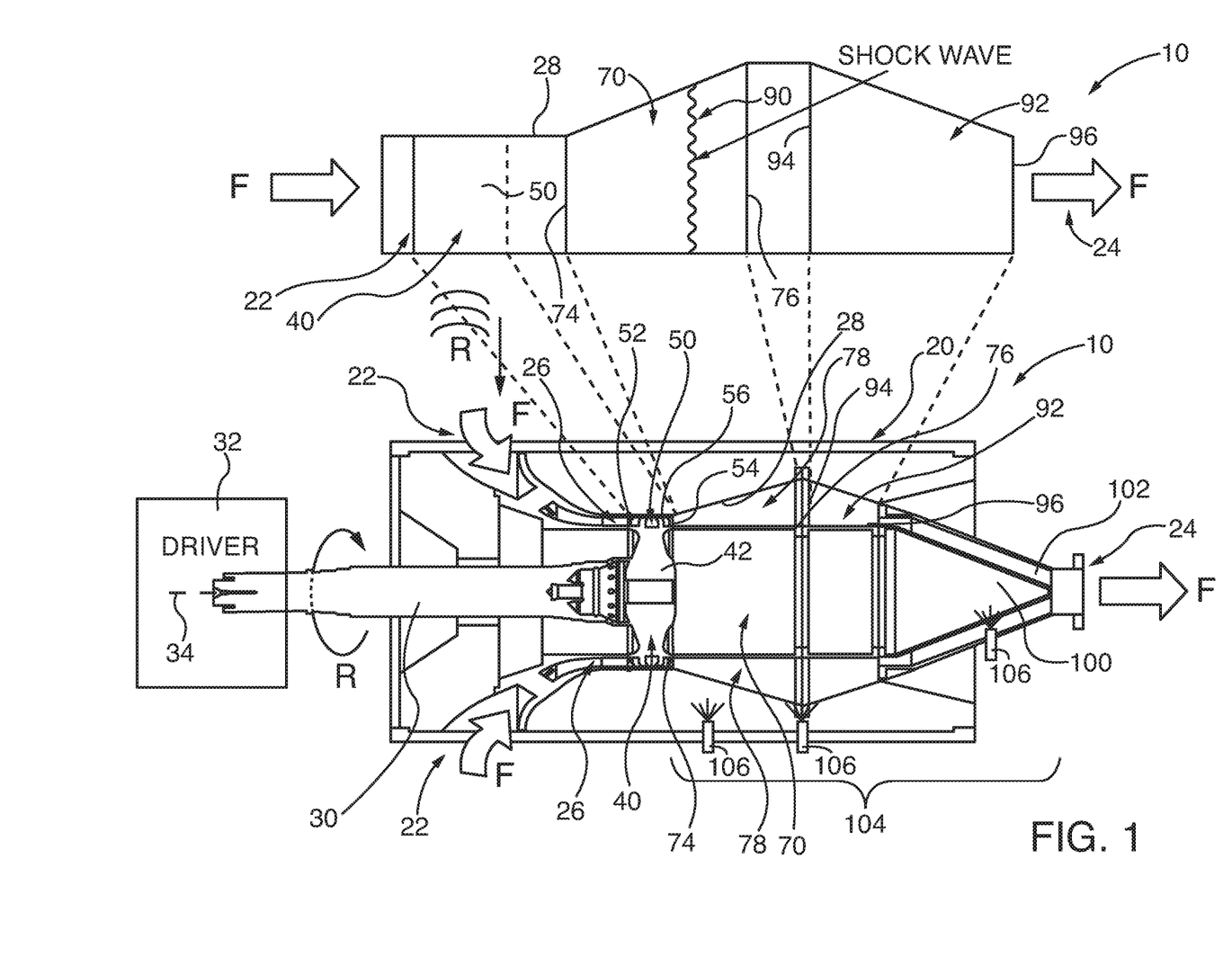
FIG. 1 is an axial cross section of a single-stage chemical reactor constructed in accordance with an embodiment of the invention and a superimposed, corresponding schematic of process-fluid flow through the reactor.
Figure 2:
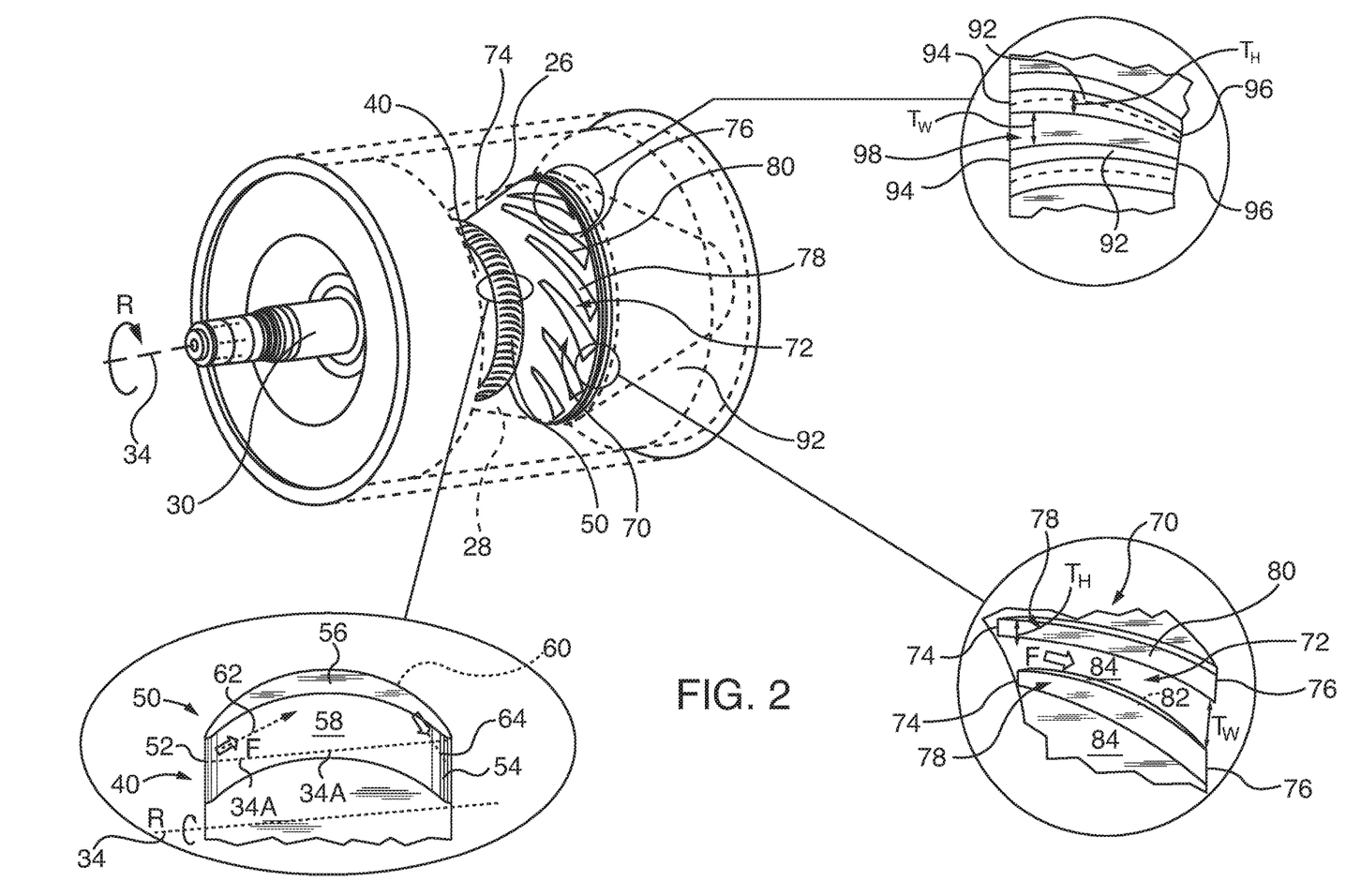
FIG. 2 is a perspective view of the chemical reactor of FIG. 1, with walls of the annular housing passage shown in phantom.

FIGS. 1 and 2 show a chemical reactor 10, for cracking hydrocarbon in a process fluid. The chemical reactor 10 is a turbomachine-type chemical reactor, including a housing 20 having a housing inlet 22, a housing exit 24. The housing inlet 22 has a radial orientation, but in other embodiments, it has an axial configuration. The housing exit 24 has an axial orientation, but in other embodiments, it has a radial configuration. Any combination of radial or axial inlets and exits for respective inflow or outflow of process fluids are utilized in chemical reactors disclosed herein.

The housing 20 defines an annular housing passage 26, within the circumferential confines of a shroud wall 28. The housing passage 26 defines a unidirectional, axial flow path F from the housing inlet 22 to the housing exit 24, for receiving and cracking hydrocarbon in a process fluid that flows through the axial flow path. A process flow diagram, showing the axial flow path F, is superimposed over the structural drawing of the chemical reactor 10. At no point along the axial flow path F does the process fluid reverse flow direction from the inlet 22 towards the exit 24.

A rotary shaft 30, in the housing 20, is circumscribed by the annular housing passage 26. The rotary shaft 30 is coupled to and driven rotatively in the direction R, by a shaft-rotating power source or driver 32, such as an electric motor, steam or gas turbine, or other combustion engine. The rotary shaft 30 defines a shaft centerline axis 34 that is in fixed orientation in the housing 20 and congruent with its axis of rotation.

An unshrouded, axial impulse impeller 40 is mounted about the rotary shaft 30 within the annular housing passage 26, and in fluid communication with process fluid flowing between the inlet 22 and exit 24 of the housing 20. The impeller 40 has an impeller hub 42 with an axial length extending axially along the shaft centerline axis 34 of the rotary shaft 30. A row of a plurality of impeller blades 50 project outwardly from the impeller hub 42, each of the impeller blades 50 has a leading edge 52 facing the housing inlet 22, a trailing edge 54 facing the housing exit 24. Each impeller blade 50 has a blade tip 56 distal the impeller hub 42 in opposed, spaced relationship with the shroud wall 28 of the annular housing passage 26, and opposed concave 58 and convex 60 blade sidewalls between the blade tip and the leading 52 and trailing edges 54. Each of the respective impeller blades 50 of the impulse impeller 40 is configured, upon rotation of the rotary shaft 30, to turn the velocity of the process fluid tangentially relative to the shaft centerline axis 34 from a first tangential direction 62 at the blade leading edge 52 to an opposite tangential direction 64 at the blade trailing edge 54, and impart energy therein to discharge the process fluid from the trailing edge 54 therefrom, at a velocity greater Mach 1. For convenience, line 34A is drawn parallel to the shaft centerline axis 34. In other embodiments, the axial impulse impeller is a shrouded impeller, with a circumferential shroud coupled to distal tips of the impeller blades.

A static annular diffuser 70, in the annular housing passage 26, is oriented between the axial impulse impeller 40 and the exit 24 of the housing 20. The static annular diffuser 70 has a row of a plurality of radially oriented, circumferentially spaced diffuser passages 72 spanning the annular housing passage 26. Each diffuser passages 72 has a first axial end 74 facing the axial impulse impeller 40, and a second axial end 76 facing the housing exit 24. In the embodiment of FIGS. 1 and 2, the diffuser passages 72 are defined by opposed pairs of helical diffuser vanes 78. Each vane has a pair of opposing sidewalls 80 and 82, separated circumferentially by a hub wall 84. The specific vane 78 structure of FIGS. 1 and 2 is a strake, having uniform wall thickness between the opposing sidewalls 80 and 82. In other embodiments, the vanes have varying thicknesses, such as airfoils. Local cross section of each diffuser passage 72 increases from its first axial end 74 to its second axial end 76. Specifically, local cross-sectional height TH of the vane passage 72 is defined between the hub wall 84 and the shroud wall 28 of the housing annular passage 26. Local cross-sectional width Tw is defined between respective opposing sidewalls 80 and 82 between two opposing vanes 78. Local cross-sectional area increase of each vane diffuser passage is accomplished by increase of local cross-sectional height TH and/or local cross-sectional width Tw. The diffuser passages 72 are configured to decelerate process fluid therein, discharged from the impeller blades 50, to a speed less than Mach 1, generating a shock wave 90 in the process fluid and raising temperature thereof downstream of the shock wave.

The chemical reactor 10 has a plurality of circumferentially spaced turning vanes 92 in the annular housing passage 26, oriented between the static annular diffuser 70 and the exit 24 of the housing 20. Each turning vane 92 has a leading edge 94 facing the static annular diffuser 70 and a trailing edge 96 facing the exit 24 of the housing 20. Opposed pairs of turning vanes 92 define a turning vane throat 98 there between, with locally varying height TH and width Tw. Local cross section of each turning vane throat decreases from its respective pair of opposed, turning-vane leading edges 94 to its respective pair of opposed, turning-vane trailing edges 96, prior to discharge from the exit of the housing 24, or to the inlet of a downstream stage of the same chemical reactor 10 or to another, separate and discrete chemical reactor 10. As shown in FIG. 1, the exit 24 is defined as an annular passage between an exhaust cone 100 and an exit transition 102. An optional, process-fluid quenching zone 104 is oriented axially downstream of the impeller 40, with discharge nozzles 106, for introduction of coolant fluid into the process fluid, in order to stabilize temperature of the process fluid. In other embodiments, the discharge nozzles 106 introduce anti-fouling fluid into the process fluid, in order to inhibit fouling within the diffuser passages 72 or any other component structures downstream of the diffuser passages. In other embodiments, one or more quenching zones are oriented at other locations downstream of the impeller 40, such as in the annular space between the exhaust cone 100 and the exit transition 102.

Figures 3, 4, 5:
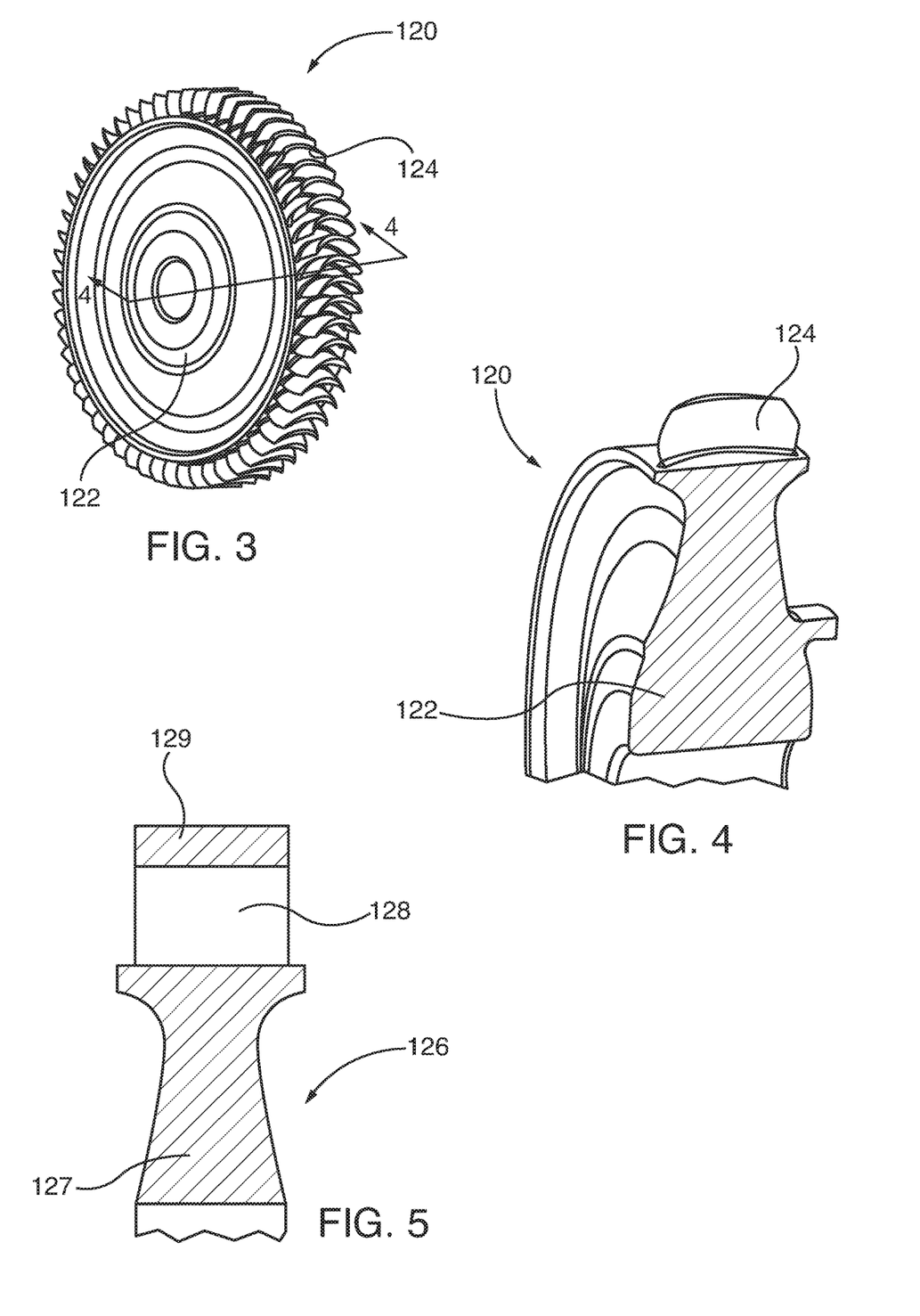
FIGS. 3-4 are respective perspective and cross-sectional views of an embodiment of a non-shrouded impulse impeller, constructed in accordance with an embodiment of the invention.
FIG. 5 is a cross sectional view of a shrouded impulse impeller, constructed in accordance with an embodiment of the invention.

Axial impulse impellers and other components of the turbomachine-type chemical reactors described herein are fabricated by known manufacturing methods, such as by joining of subcomponent hubs and blades, whether originating from any one or more of forgings, castings, additive manufacture, and/or shaped billets. The exemplary unshrouded, axial impulse impeller 120 embodiment of FIGS. 3 and 4 has a monolithic impeller hub 122 and impeller blades 124, formed by casting, forging, additive manufacture or shaping/cutting of a billet. The shrouded, monolithic axial-impulse impeller 126 embodiment of FIG. 5 has a hub 127, blades 128, and circumferential shroud 129 at the distal tips of the blades.

In some embodiments at least two or more of the chemical reactors, with sequential axial impulse impellers 40 and shockwave inducing, static annular diffusers 70 of the type shown in FIGS. 1 and 2 are sequentially coupled in stages. As so constructed, process fluid discharged by the static diffuser 70 of one reactor 10 is in fluid communication with the axial impulse impeller 40 of another reactor. In these multi-stage embodiments, the respective reactors 10 are in separate respective housings 20 or in a shared common housing.

Figure 6:
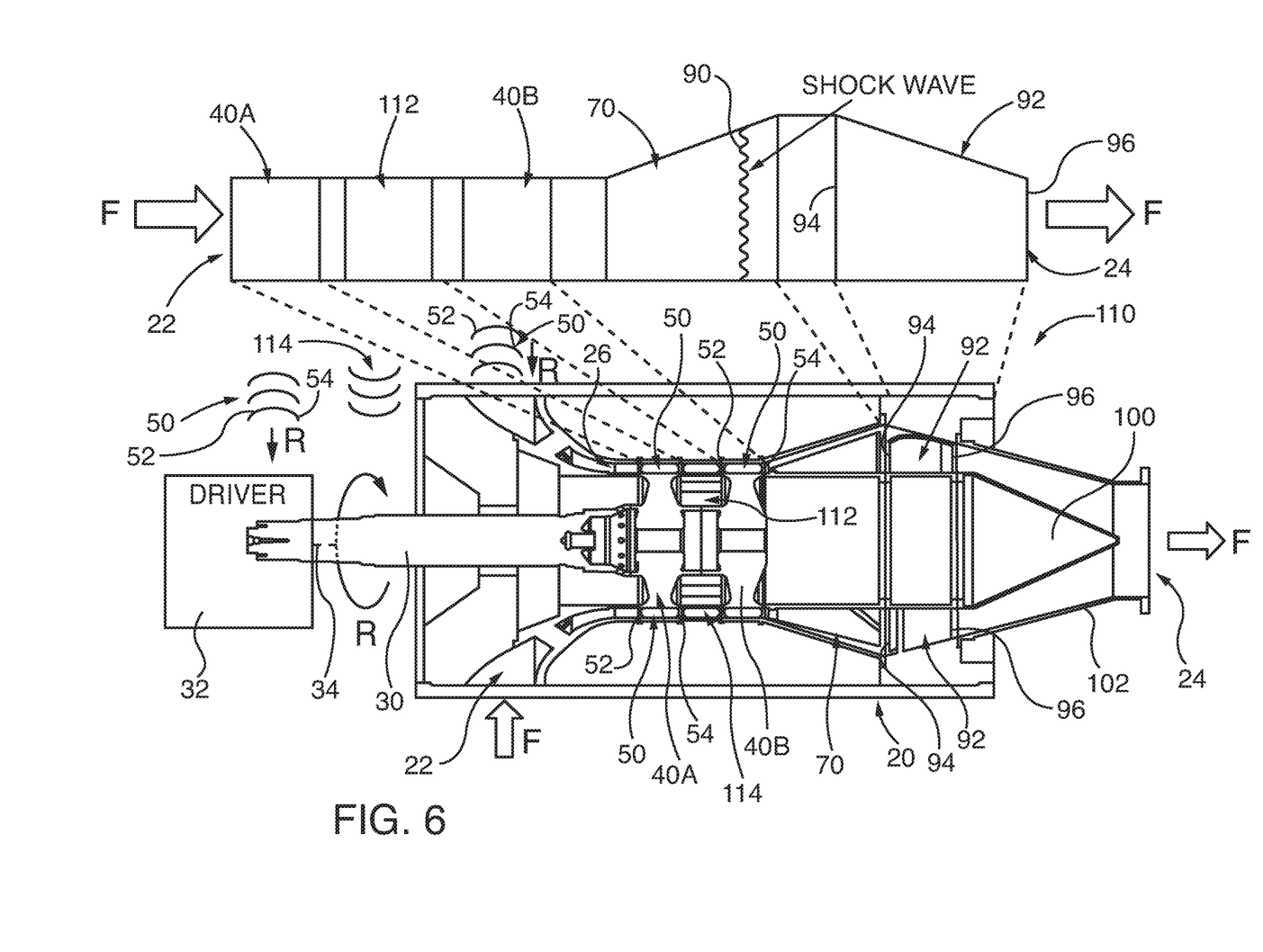
FIG. 6 is an axial cross section of a single-stage, twin impulse impeller, chemical reactor constructed in accordance with an embodiment of the invention and a superimposed, corresponding schematic of process-fluid flow through the reactor.

The chemical reactor 110 of FIG. 6 has a pair of axially spaced, first 40A and second 40B axial impulse impellers commonly mounted about the rotary shaft 30. Unless otherwise noted, structure of individual components within the chemical reactor 110 is similar to those of the chemical reactor 10 of FIGS. 1 and 2. The trailing edges 54 of the blades 50 of the first impeller 40A face the leading edges 52 of the blades 50 of the second impeller 40B. A turning bucket 112 is interposed between the first 40A and second 40B axial impulse impellers. The turning bucket 112 has a row of stationary turning bucket vanes 114 in the annular housing passage 26, for aligning process fluid flow discharged from trailing edges 54 of the first impeller blades 50 of the first impeller 40A parallel to leading edges 52 of the blades 50 of the second impeller 40B.

Figure 7:
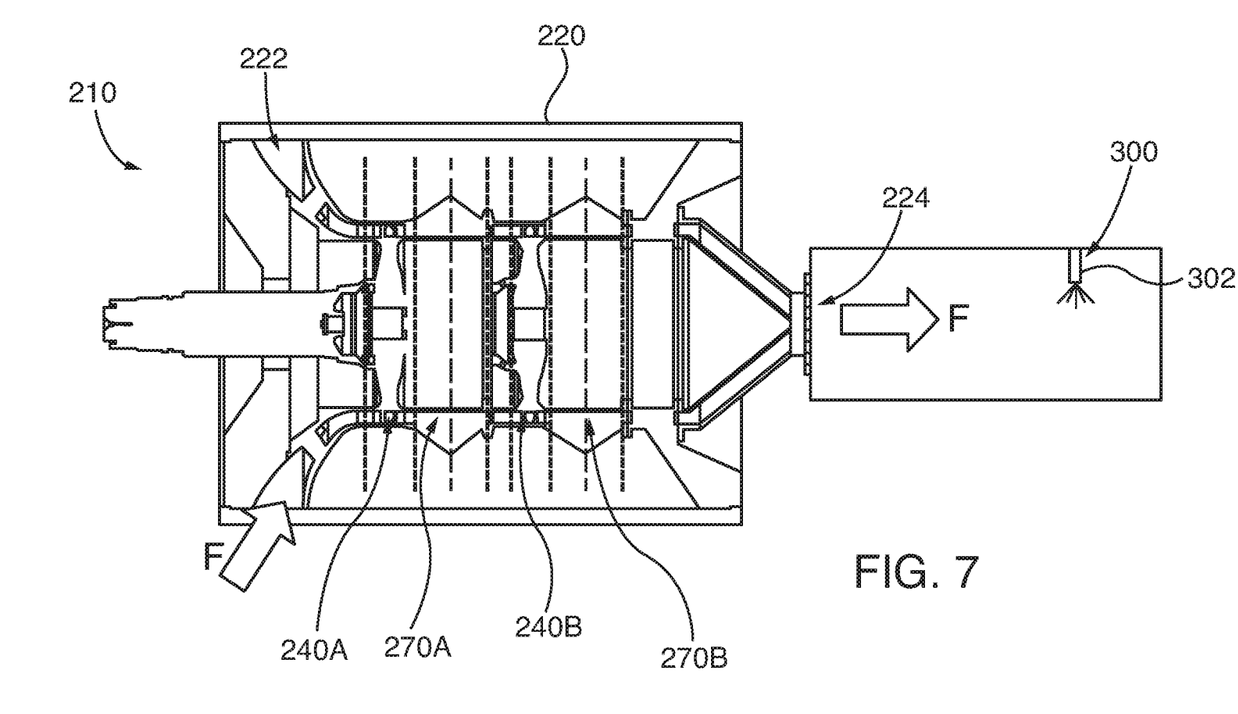
FIG. 7 is a two-stage chemical reactor, constructed in accordance with an exemplary embodiment of the invention.

The two-stage, turbomachine-type chemical reactor 210 of FIG. 7, comprises a first-stage axial impeller 240A and first-stage, static annular diffuser 270A downstream of the housing inlet 222. A sequential second stage includes an axial impeller 240B and a static annular diffuser 270B. Both of the first and second stages are oriented with a shared, common housing 220. In other embodiments, the first and second stages are in separate housings. A process-fluid quenching zone 300 is in communication with the exhaust exit 224, axially downstream of the impeller 240B. Nozzles 302 introduce coolant fluid into the process fluid, in order to stabilize temperature of the process fluid. In other embodiments, the nozzles 302 introduce anti-fouling fluid into the process fluid, in order to inhibit fouling within chemical plant components that are downstream of, and subsequently in contact with the process fluid.

In other embodiments, a turbomachine that incorporates a paired axial impulse impeller and a static annular diffuser of the types used in the turbomachine-type chemical reactor 10, 110 or 210, is used to preheat process fluid prior to introduction into a downstream, turbomachine-type chemical reactor that generates sufficient temperature increase to crack hydrocarbons in the process fluid. The preheater includes a preheating impulse impeller, similar to the impeller 40 of FIG. 1, for accelerating the process fluid to a velocity greater than Mach 1; and a pre-heating, static annular diffuser, similar to the diffuser 70 of FIG. 1, for decelerating the process fluid flowing therethrough to a speed less than Mach 1, generating a shock wave in the process fluid within those diffuser passages, and raising temperature thereof downstream of the shock wave.

Figure 8A:
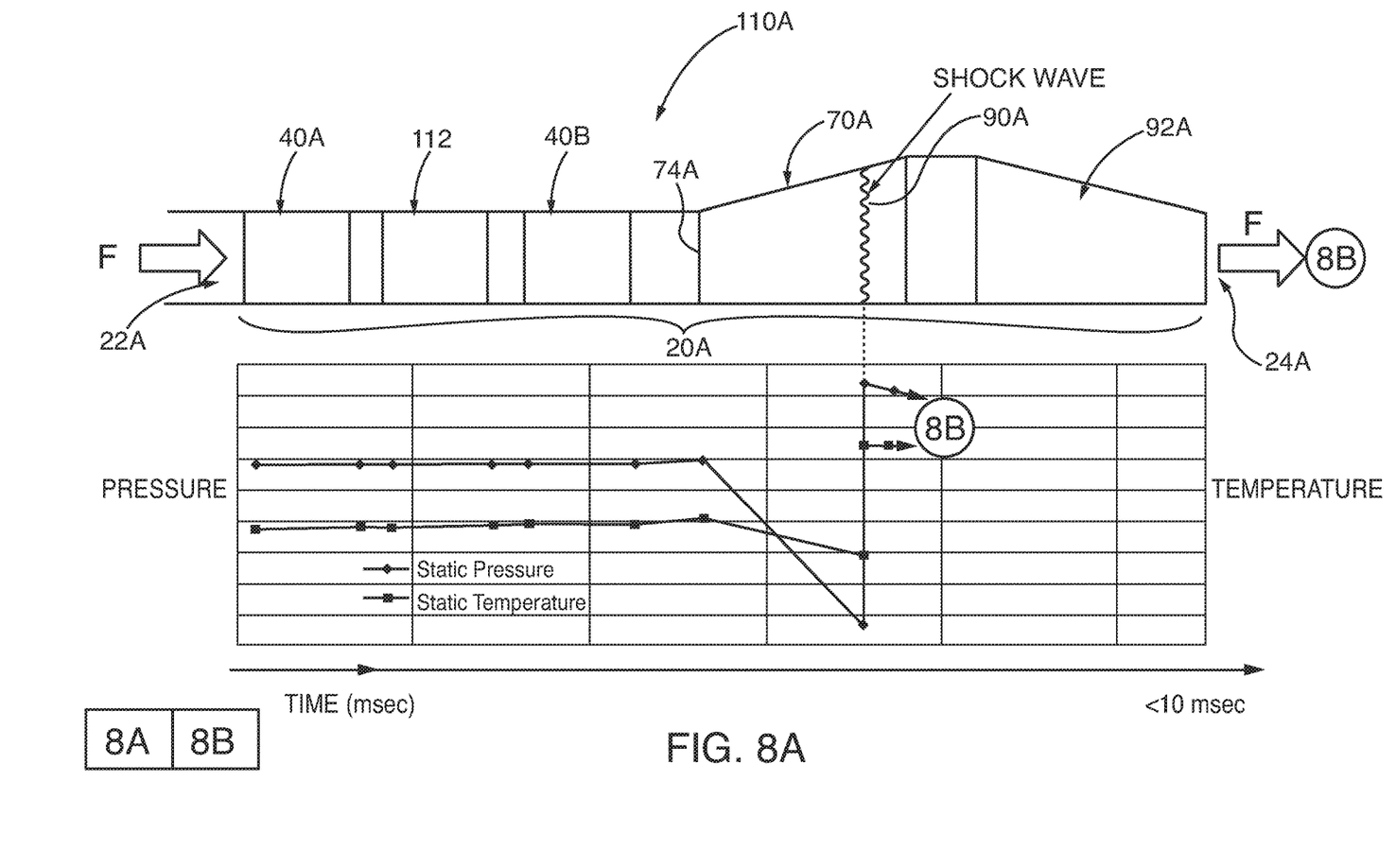
FIGS. 8A and 8B are schematics of process-fluid flow through a pair of turbomachine-type, chemical reactors and calculated static pressure and temperature flow conditions of a hydrocarbon-containing process fluid, at various locations along the axial flow path F, through an exemplary chemical reactor having respective first and second stages constructed in accordance with the embodiment of FIG. 6.
Figure 8B:
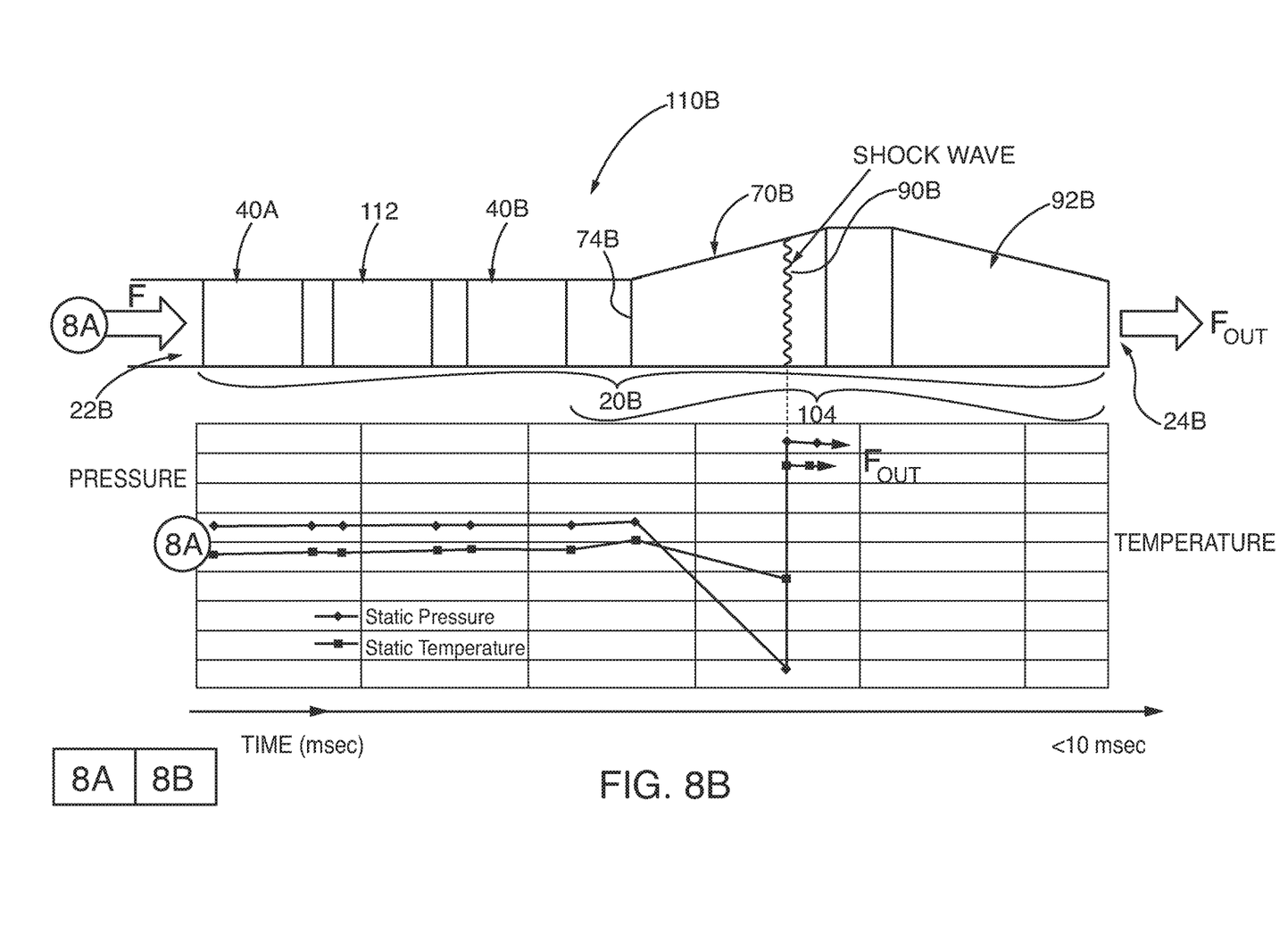

Joined FIGS. 8A and 8B are schematics of process-fluid flow through a pair of turbomachine-type, chemical reactors 110A, 110B, and calculated static pressure and temperature flow conditions of a hydrocarbon-containing process fluid, at various locations along the axial flow path F. The exemplary chemical reactor has respective first 110A and second 110B stages constructed in accordance with the embodiment of FIG. 6. As previously described, the components of the reactor 110 of FIG. 6 is substantially similar to the corresponding components of the reactor 10 of FIGS. 1 and 2. Hence, designations or components will be used interchangeably among all of those figures.

The reactors 110A and 110B of FIGS. 8A and 8B are shown in separate respective housings 20A and 20B, but in other embodiments, they share a common housing. In some embodiments, the reactor has more than two stages. One or more initial stages of other reactor embodiments are preheaters for heating the process fluid to a temperature below that needed to initiate and/or sustain a cracking reaction. Then, in those embodiments, one or more subsequent, downstream stages crack the hydrocarbons. Specific static pressures and temperatures, as well as slopes of the static pressure and temperature curves, vary with the specific heat and reaction rates of different process fluids/hydrocarbon mixtures. Any process fluid/hydrocarbon mixture is expected to exhibit similar general changes in temperature and pressure as shown in the underlying curves of FIGS. 8A and 8B, as it flows through stages.

Referring specifically to FIG. 8A, and generally to FIGS. 1, 2, and 6, hydrocarbon-containing process fluid is introduced into the housing inlet 22/22A at a given temperature and pressure. In some embodiments, the process fluid is preheated by application of external heat in a heat exchanger, or by a shock wave induced in a turbomachine-type preheater having the a paired axial impulse impeller and a static annular diffuser of the types described herein. The process fluid is accelerated by driving the impeller 40A, whose construction is similar to the impellers 40A of FIG. 6 and impeller 40 of FIG. 2. As shown in FIG. 2, rotating blades 50 of the impeller 40 turn the velocity of the process fluid tangentially, relative to the shaft centerline axis 34 or its parallel axis 34A, from a first tangential direction 62 the at leading-edge, axial end 52 of the impeller to an opposite tangential direction 64 at a trailing-edge 54, axial end of the impeller. The impeller 40A of FIG. 8A (as well as FIG. 6), accelerates the process fluid, without a significant increase of either static pressure or static temperature (i.e., changes in either of plus or minus ten percent). Process fluid discharged from the trailing edge 54 of the blades 50 of impeller 40A is directed through the turning vanes 114 of the turning bucket 112, which aligns its flow direction with the leading edge 52 of the blades 50 of impeller 40B. The impeller 40B in turn accelerates the process fluid to a higher velocity than that of the impeller 40A—above Mach 1. Process fluid is discharged from the trailing edge 54 of the blades 50 of the impeller 40B, without a significant increase of either static pressure of static temperature (i.e., changes in either of plus or minus ten percent). As shown in FIG. 8A, the process fluid pressure, and temperature curves are relatively flat from the inlet 22A through discharge from the second impeller 40B.

Process fluid discharged from the second impeller 40B enters the static annular diffuser 70A at the first axial end 74A. The locally increasing, cross-sectional area of the diffuser passages 72 (see e.g., FIGS. 1 and 2) decelerates the process fluid to a speed less than Mach 1, causing a significant reduction in both static temperature and pressure. The deceleration induces a shock wave 90A in the diffuser passages 72, somewhere along the axial length of the static diffuser 70A. Axial location of the shock wave 90A varies with properties of the process fluid/entrained hydrocarbons, back pressure in the axial flow path F within and/or downstream of the static diffuser 70A, diffuser passage 72 and/or turning vane 92 and/or housing exit 24A geometry (e.g., the locally varying cross-section of any of them), and other factors. The shock wave 90A induces a downstream temperature increase that is sufficient to crack hydrocarbons in the process fluid. In some embodiments, the shock wave 90A raises absolute temperature of the process fluid from the inlet 22A of the housing to downstream of the shockwave by at least ten percent (10%), within ten milliseconds (10 MS), without changing static pressure by more than plus or minus ten percent (10%). In some embodiments, cracking reaction continues at least partly through the turning vanes 92A and the exit 24A, causing a temperature decrease in the process fluid, as shown by the arrowed line segments terminating at reference number 8B. Process fluid exits the housing exit 24A, for further processing by the second stage reactor 110B.

Referring to FIG. 8B, and generally also to FIGS. 1, 2, and 6, process fluid exiting the housing exit 24A of the reactor 110A (labeled 8A) is introduced into the housing inlet 22B. Due to heat absorption by the process fluid downstream of the shock wave 90A, for sustainment of cracking reactions, temperature of the process fluid entering the housing inlet 22B is generally lower than it was immediately downstream of the shock wave 90A. The process fluid is re-accelerated, to a speed greater than Mach 1, in the reactor 110B by sequential passage through the impulse impeller 40A, the turning bucket 112, and the impulse impeller 40B, while respective static pressure and temperature remain relatively stable (i.e., plus or minus ten percent).

Again, as in the reactor 110A, process fluid discharged from the second impeller 40B of the reactor 110B enters the static annular diffuser 70B at the first axial end 74B. The locally increasing, cross-sectional area of the diffuser passages 72 (see e.g., FIGS. 1 and 2) decelerates the process fluid to a speed less than Mach 1, causing a significant reduction in both static temperature and pressure. The deceleration induces a shock wave 90B in the diffuser passages 72, somewhere along the axial length of the static diffuser 70B. Axial location of the shock wave 90B within the static annular diffuser 70B varies with properties of the process fluid/entrained hydrocarbons, back pressure in the axial flow path F within and/or downstream of the static diffuser 70B, diffuser passage 72 and/or turning vane 92B and/or housing exit 24B geometry (e.g., the locally varying cross-section of any of them), and other factors. The shock wave 90B induces a downstream temperature increase that is sufficient to crack hydrocarbons in the process fluid. In some embodiments, the shock wave 90B raises absolute temperature of the process fluid from the inlet 22B of the housing to downstream of the shockwave by at least ten percent (10%), within ten milliseconds (10 MS), without changing static pressure by more than plus or minus ten percent (10%). In some embodiments, cracking reaction continues at least partly through the turning vanes 92B and the exit 24B, causing temperature and pressure decreases in the process fluid, as shown by the arrowed line segments terminating at reference number $F_{OUT}$. In some embodiments, the turning vanes constrict flow cross sectional area of the process fluid. The process fluid $F_{OUT}$ exits the housing exit 24B, for further processing. In some embodiments, a quenching zone 104 is incorporated in the second stage reactor 110B downstream of the second impulse impeller 40B, to control the cracking reaction rate by injection of cooling steam or other cooling and/or anti-fouling fluids. In some embodiments, the quenching zone 104 terminates further cracking reactions. In some embodiments a quench exchanger, such as the quench exchanger 300 of FIG. 7 is in fluid communication with the housing exit 24B.

Embodiments of turbomachine-type chemical reactors disclosed herein facilitate cracking of hydrocarbons entrained within a process fluid, without application of external heat, as required for pyrolysis-type chemical reactors. The presently disclosed reactors, with their unidirectional, axial flow path through an annular housing passage, assure high mass flow rate and quicker cracking reaction times than known pyrolysis-type chemical reactors. Fewer of the presently disclosed chemical reactors are required to process a desired, cracked hydrocarbon output rate than known pyrolysis-type chemical reactors; this reduces plant construction and maintenance costs.

Although various embodiments that incorporate the invention have been shown and described in detail herein, others can readily devise many other varied embodiments that still incorporate the claimed invention. The invention is not limited in its application to the exemplary embodiment details of construction and the arrangement of components set forth in the description or illustrated in the drawings. The invention is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted", "connected", "supported", and "coupled" and variations thereof are to be interpreted broadly; they encompass direct and indirect mountings, connections, supports, and couplings. Further, "connected" and "coupled" are not restricted to physical, mechanical, or electrical connections or couplings.

What is claimed is:

1. A chemical reactor for cracking hydrocarbons in a process fluid, comprising:
    a housing having: a housing inlet; a housing exit; and an annular housing passage, which defines a unidirectional, axial flow path from the housing inlet to the housing exit, for receiving and cracking hydrocarbon in a process fluid therein;
    a rotary shaft, in the housing, circumscribed by the annular housing passage, for coupling to a shaft-rotating power source, the rotary shaft defining a shaft centerline axis that is in fixed orientation in the housing and congruent with its axis of rotation;
    a first axial impulse impeller and a second axial impulse impeller commonly mounted about the rotary shaft within the annular housing passage and in fluid communication with process fluid flowing between the inlet and exit of the housing, the first and second axial impulse impellers axially spaced from one another, with trailing edges of the first axial impulse impeller facing leading edges of the second axial impulse impeller;
    a row of stationary turning bucket vanes interposed between the first and second axial impulse impellers for aligning process fluid flow discharged from trailing edges of the first impeller parallel to leading edges of the second impeller;
    each impeller having: an impeller hub with an axial length extending axially along the shaft centerline axis of the rotary shaft; a row of a plurality of impeller blades projecting outwardly from the impeller hub, each of the impeller blades respectively having: a leading edge facing the housing inlet, a trailing edge facing the housing exit, a blade tip distal the impeller hub in opposed, spaced relationship with the annular housing passage, and opposed concave and convex blade sidewalls between the blade tip and the leading and trailing edges thereof;
    the impeller blades configured, upon rotation of the rotary shaft, to turn the flow of the process fluid tangentially relative to the shaft centerline axis from a first tangential direction at the blade leading edge to an opposite tangential direction at the blade trailing edge, and impart energy therein to discharge the process fluid from their respective trailing edges therefrom, at a velocity greater than Mach 1;

a static annular diffuser in the annular housing passage, oriented between the second axial impulse impeller and the exit of the housing, the static annular diffuser having a row of a plurality of radially oriented, circumferentially spaced diffuser passages spanning the annular housing passage;

each of the diffuser passages having: a first axial end facing the second axial impulse impeller, and a second axial end facing the housing exit, local cross section of each diffuser passage increasing from its first axial end to its second axial end;

the diffuser passages configured to decelerate process fluid flowing through the diffuser passages, discharged from the impeller blades, to a speed less than Mach 1, and generating within the diffuser passages a shock wave in the process fluid and sufficiently raising temperature of the process fluid downstream of the shock wave to crack hydrocarbons in the process fluid, prior to discharge of the process fluid from the exit of the housing; and circumferentially spaced turning vanes in the annular housing passage, oriented between the static annular diffuser and the exit of the housing, the respective turning vanes having a leading edge facing the static annular diffuser and a trailing edge facing the exit of the housing, opposed pairs of turning vanes defining a turning vane throat there between, local cross section of each turning vane throat decreasing from its respective pair of opposed, turning-vane leading edges to its respective pair of opposed, turning-vane trailing edges.

2. The chemical reactor of claim 1, wherein the respective circumferentially spaced, diffuser passages are defined between a shroud wall of the annular housing passage and helical diffuser vanes, the diffuser vanes having opposed, radially outwardly directed vane side walls separated by a hub wall; local cross section of the respective diffuser passages defined by vane throat width between opposing, adjoining vanes and vane throat height from the hub wall to the shroud wall of the annular housing passage, with either or both respective diffuser passage throat width and/or height increasing from the first axial end to the second axial end of the diffuser passage.

3. The chemical reactor of claim 1, further comprising a process-fluid quenching zone axially downstream of the second axial impulse impeller, for introduction of coolant fluid into the process fluid, in order to stabilize temperature of the process fluid; or for introduction of anti-fouling fluid into the process fluid, in order to inhibit fouling within the diffuser passages.

4. A system comprising: at least two of the chemical reactors of claim 1, sequentially coupled, with process fluid discharged by the turning vanes of one reactor in fluid communication with the first axial impulse impeller of another reactor, where the respective reactors are in separate respective housings or in a shared common housing.

5. The chemical reactor of claim 1, wherein each axial impulse impeller comprises a monolithic impeller hub and impeller blades.

6. The chemical reactor of claim 1, further comprising a process fluid preheater coupled to the housing inlet, for preheating process fluid prior to introduction into the reactor; the process fluid preheater including: a preheating impulse impeller for accelerating the process fluid to a velocity greater than Mach 1; and a pre-heating static annular diffuser comprising diffuser passages, for decelerating the process fluid flowing therethrough to a speed less than Mach 1, generating a shock wave in the process fluid within the diffuser passages of the pre-heating static annular diffuser, and raising the temperature thereof downstream of the shock wave.

7. A method for cracking hydrocarbons in a process fluid, comprising:

providing a chemical reactor having:
a housing having: a shaft centerline axis that is in fixed orientation in the housing; a housing inlet; a housing exit; and an annular housing passage defining a unidirectional, axial flow path for the process fluid from the housing inlet to the housing exit;
a first axial impulse impeller and a second axial impulse impeller commonly mounted about the rotary shaft within the annular housing passage to be rotatively driven about an impeller axis of rotation that is congruent with the shaft centerline axis, the first and second axial impulse impellers axially spaced from one another, with trailing edges of the first axial impulse impeller facing leading edges of the second axial impulse impeller;
a static annular diffuser within the annular housing passage, having a first axial end facing the second axial impulse impeller and a second axial end facing the exit of the housing, the static annular diffuser defining diffuser passages having locally increasing, cross-sectional area from the first to the second axial end thereof; and
circumferentially spaced turning vanes in the annular housing passage, oriented between the static annular diffuser and the exit of the housing, the respective turning vanes having a leading edge facing the static annular diffuser and a trailing edge facing the exit of the housing, opposed pairs of turning vanes defining a turning vane throat there between, local cross section of each turning vane throat decreasing from its respective pair of opposed, turning-vane leading edges to its respective pair of opposed, turning-vane trailing edges;

introducing a flow of hydrocarbon-containing process fluid into the housing inlet;

driving the first and second axial impulse impellers rotatively with a shaft-rotating power source, turning flow of the process fluid tangentially relative to the shaft centerline axis from a first tangential direction at respective leading edges of blades of each impeller to an opposite tangential direction at respective trailing edges of blades of each impeller, and imparting energy therein, accelerating the process fluid to a velocity greater than Mach 1;

aligning process fluid flow discharged from the respective trailing edges of blades of the first impeller parallel to the respective leading edges of blades of the second impeller by interposing a row of stationary turning bucket vanes in the annular housing passage between the first and second axial impulse impellers; and discharging the process fluid from the second axial impeller through the diffuser passages of the static annular diffuser, decelerating the process fluid flowing through the diffuser passages to a speed less than Mach 1, and generating within the diffuser passages a shock wave in the process fluid, the shock wave sufficiently raising the temperature of the process fluid downstream of the shock wave, and cracking the hydrocarbons in the process fluid.

8. The method of claim 7, further comprising quenching the process fluid with a coolant fluid, axially downstream of the second axial impulse impeller, in order to stabilize temperature of the process fluid; or with an anti-fouling fluid, in order to inhibit fouling within the diffuser passages.

9. The method of claim 7, further comprising constricting flow cross sectional area of the process fluid axially downstream of the static annular diffuser with the turning vanes.

10. The method of claim 7, further comprising sequentially coupling at least two of the chemical reactors, routing process fluid discharged by the turning vanes of one reactor to the first axial impulse impeller of another reactor, where the respective reactors are in separate respective housings or in a shared common housing.

11. The method of claim 7, further comprising pre-heating the process fluid prior to its introduction into the housing inlet of the chemical reactor, by:
   accelerating the process fluid with a preheating impulse impeller to a velocity greater than Mach 1; and
   discharging the process fluid from the preheating, impulse impeller through diffuser passages of a pre-heating, static annular diffuser, decelerating the process fluid flowing therethrough to a speed less than Mach 1, generating a shock wave in the process fluid within those diffuser passages, raising the temperature thereof downstream of the shock wave.

12. The method of claim 7, further comprising changing a position of the shock wave generated in the process fluid within the diffuser passages, by modifying one or more of a cross section of the housing exit, and/or constriction of process fluid flow downstream of the static annular diffuser, and/or backpressure of the process fluid within the static annular diffuser.

13. The method of claim 7, wherein the generating of the shockwave is effective to raise the absolute temperature of the process fluid from the inlet of the housing to downstream of the shockwave by at least ten percent (10%), within ten milliseconds (10 MS), without changing static pressure by more than plus or minus ten percent (10%).

* * * * *